Feb. 22, 1966   A. J. PIPPERT   3,236,000

ARTIFICIAL LURE FOR FISH

Filed May 21, 1963

INVENTOR.
AARON J. PIPPERT
BY Browning, Simmons,
Hyer & Eickenroht

United States Patent Office 3,236,000
Patented Feb. 22, 1966

3,236,000
ARTIFICIAL LURE FOR FISH
Aaron J. Pippert, 5200 Clinton Drive, Houston 20, Tex.
Filed May 21, 1963, Ser. No. 281,869
6 Claims. (Cl. 43—42.18)

This invention relates generally to improvements in fish lures of the artificial type. In one of its aspects, the invention relates to a lure device which can be removably attached to a ring adapted to connect a fish hook either to an artificial lure or directly to a fishing line to attract fish to the hook itself or to enhance the ability of the artificial lure to attract fish.

It is one of the objects of this invention to provide an artificial fish device which can be removably attached to a ring carrying a hook without having to remove the hook from the ring and which will return to its original shape after installation.

It is another object of this invention to provide an artificial lure device which can be removably attached to a ring carrying a single or multiple barbed hook and which will not interfere with or reduce the ability of the barb, or barbs, on the hook to catch a fish striking the device.

It is another object of this invention to provide a lure device which can be removably attached to a ring adapted to connect a fish hook to either an artificial lure or directly to a fishing line with a minimum of distortion even though the portion of the device which is inserted through the ring is considerably wider than the opening through the ring.

Other objects, advantages and features of the invention will be apparent to one skilled in the art from a consideration of the drawings, specification and appended claims.

In the drawings, wherein like reference characters are used throughout to designate like parts:

Figure 3:
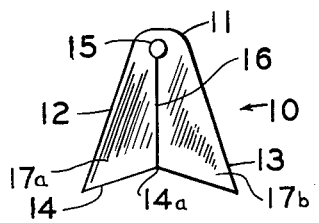
FIG. 3 is a plan view of the embodiment of the invention shown in FIG. 1.
Figure 4:
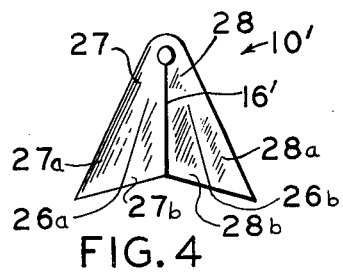
FIG. 4 is a plan view of an alternate embodiment of the invention.

As shown in FIGS. 3 and 4, the preferred embodiments of this invention are elongated pieces of flat material which are generally V-shaped to more or less resemble the caudal or tail fin of a fish. For example, the embodiment of the lure device of the invention shown in FIG. 3, which is generally indicated by the number 10, is an elongated piece of flat, flexible material having a rounded upper end 11 and sides 12 and 13 which diverge outwardly toward the V-shaped lower end 14 to thereby approximate the shape of the tail fin of a fish. The lure device is also provided with hole 15 adjacent its upper end and slit 16 which extends from opening 15 to the lower end 14 and preferably divides that portion of the device between opening 15 and lower end 14 into two symmetrically shaped portions 17a and 17b.

The device is made from a piece of flat, relatively thin flexible material which should be water resistant and have sufficient strength to withstand the buffeting it will receive from the water as it is cast out and retrieved and by the fish it is anticipated will strike it. Numerous types of flexible plastic in sheet form which are suitable are readily available. Also, the device should be provided in a plurality of colors so that the proper color for any given fishing condition will be available. For fishermen who prefer lures having different colors on each side, the device can be made of a lamination of different colored material, the material being laminated either before or after the material is cut to the desired shape. In this way, a lure dark on one side and bright on the other, etc., can also be provided without the use of paint, enamel, stain or other material subject to chipping, peeling or fading.

Figure 1:
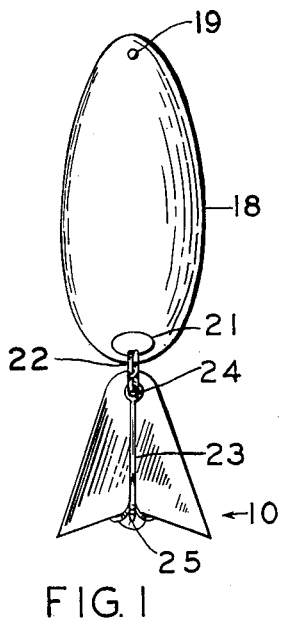
FIG. 1 is a plan view of one embodiment of the lure device of this invention attached to a conventional spoon type fishing lure equipped with one treble hook.
Figure 2:
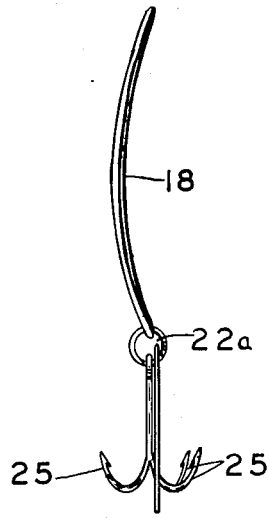
FIG. 2 is a side view of the spoon of FIG. 1.

In FIG. 1, the lure device is shown attached to a conventional spoon. The spoon consists of a curved metal body 18 which is provided with opening 19 at one end for attaching the spoon to a fishing line (not shown) and opening 21 at the other end to which is attached split end ring 22. Attached to split ring 22 is treble hook 23 and lure device 10, the embodiment of the invention illustrated in FIG. 3.

To attach the device to the spoon, either portion 17a or 17b is inserted through opening 22a of ring 22 to allow one side of the ring to engage opening 15. Preferably, opening 15 is large enough to accommodate the side of the ring with some clearance. Preferably also, the opening is located close enough to upper end 11 to allow the material between the opening and the upper end to pass freely through the ring. The dimensions of the portions on opposite sides of the slit are made too great to pass through the ring without crushing, bending or rolling. To this end the opening and slit are so located that the distance between the opening and the upper end is less than its distance from the lower end and the lateral edges, and less than the distance from at least a portion of the slit to an adjacent lateral edge. In this way, once the ring is in position in the opening, the material of the device will be free to resume its original shape and will prevent the device from being accidentally dislodged from the ring. Also, by making end 11 curved as shown, the device is free to rotate with the hook around the side of the ring but all strain on the device from being drawn through the water by the ring or from being pulled on by a fish or the like will tend to tighten the lodgement of the device in the ring and hold the slit closed, rather than tending to open the slit or dislodge the device from the ring.

In addition, the length from opening 15 to apex 14a of V-shaped lower end 14 is preferably less than the distance from eyelet 24 of the hook to where barbs 25 of the hook start bending upward. This will keep the device from covering or interfering with the barbs and, conversely, keep the barbs from interfering with the action of the device as it travels through the water. In other words, when this device is used with a conventional spoon or any other lure which wiggles as it travels through the water, it is desirable that the device be free to wiggle also to simulate the action of a fish's tail. Generally, the hook will not interfere with this action unless it causes a deformation of the device because of its size.

Figure 5:
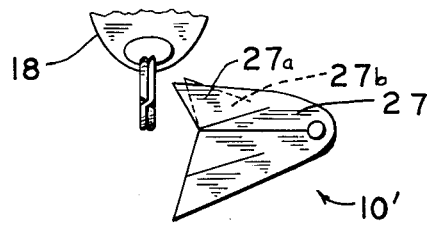
FIG. 5 is a view illustrating how the embodiment of FIG. 4 can be inserted through a ring such as the ring attached to the spoon of FIG. 1 with a minimum of distortion.

When it is desired to use a wider device or when the ring to which the device is to be attached has a relatively small opening, the embodiment of the lure device of the invention shown in FIG. 4 can be used. This embodiment, indicated by the number 10′, is generally the same as that shown in FIG. 3 with the addition of slits 26a and 26b located on each side of slit 16′. Preferably, in this embodiment, as was the case in the embodiment shown in FIG. 3, slit 16′ divides the device into two symmetrically shaped portions 27 and 28. These portions in turn are partially divided into two additional sections 27a and 27b and 28a and 28b by the slits 26a and 26b. With this arrangement, the effective width of either of the portions 27 and 28 can be reduced for purposes of insertion approximately in half by overlapping the sections on each side of either of the slits 26a and 26b in the manner shown in FIG. 5 where section 27a is placed over section 27b, thereby reducing by approximately one-half the width of portion 27 of the device. In this way, the device can be inserted through the opening of ring 22 with a minimum of distortion of the material. Once in place, this embodiment, like the embodiment of FIG. 3, will return to its original shape completely free of stress and free to simulate a fish's tail as it moves through the water.

The device is shown in the drawings in connection with a spoon which is a conventional artificial lure and, in this sense, it is used to enhance the ability of the spoon to attract fish. The device can also be used with other types of lures or alone with only a ring and a hook and thus act as the entire lure.

From the above description, it can be seen that this is an extremely simple device which can be cheaply manufactured and easily installed and removed from any ring adapted to attach a hook either to an artificial lure or directly to a fishing line. Being as easy to remove as it is to install, the device can be changed and reused as desired.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a fishing lure having a ring attached thereto adapted to connect a hook to the lure, the improvement in combination therewith of a device removably attached to the ring on the lure, said device being an elongated piece of flat, flexible, water-resistant material having an upper end, a lower end and sides diverging outwardly from the upper end to the lower end, said device having an opening located adjacent the upper end and relatively substantially more remote from the lower end to receive one side of the ring and a slit extending from the lower end to the opening to divide the device between the opening and the lower end into two portions, whereby one portion can be inserted through the ring with one side of the ring traveling along the slit to the opening to thereby removably attach the device to the ring, said opening being located sufficiently close to the upper end of the device to allow the portion of the device between the opening and the upper end to extend through the ring without being deformed and the dimensions of the two portions on opposite sides of said slit below said opening being too great to pass through said ring without crushing, bending or rolling.

2. In a fishing lure having a body, a hook, and a ring attaching the hook to the body, the improvement in combination therewith of a device removably attached to the ring, said device being an elongated piece of flat, flexible material and provided with upper and lower ends and an opening adjacent the upper end to receive the ring; said device being provided with a slit extending from the opening in the device to its lower end to thereby divide the device between the opening and the lower end into two separate symmetrically shaped portions, each portion having a slit extending from the lower end of the device toward the opening a sufficient distance to allow the two parts of each portion thus formed to be overlapped prior to being forced through the ring to thereby reduce the distortion necessary to attach the device to the lure.

3. A fishing lure comprising a fish hook, a ring connected to the fish hook, and a device removably attached to the ring to attract fish to the hook, said device being an elongated piece of flat, flexible, water-resistant material provided with an upper end, a lower end, and sides diverging outwardly from the upper end to the lower end, said device having an opening adjacent the upper end and a first slit extending from the opening to the lower end to divide the device between the opening and the lower end into two portions, and a second slit located in one of the portions, said second slit extending from the lower end of the device toward the opening a sufficient distance to allow the portion to be partially overlapped before being passed through the ring to thereby reduce the deformation required of the device to attach it to the ring.

4. As an article of manufacture, a fishing lure comprising a flat piece of flexible material having an upper end, a lower end, and sides diverging outwardly from the upper to the lower end; said lure being provided with an opening adjacent the upper end, a first slit extending from the opening to the lower end, and a second slit located between the first slit and one of the diverging sides and extending from the lower end generally toward but stopping short of the opening.

5. As an article of manufacture, a fishing lure made from flat, flexible material and shaped to resemble the caudal fin of a fish, said lure in outline having a marginal edge with a V-shaped base and sides converging from the legs of the V of the base to provide a configuration narrowing to a rounded upper end; narrower than the lure therebelow; said lure being provided with an opening adjacent and generally centrally of the curved edge of the rounded upper end and closer to said curve than to any other part of the edge of the lure and a slit extending from the opening to the base whereby a ring only slightly larger than the distance between said opening and said rounded upper end may be engaged with said opening but will be restrained from disengagement therewith without distortion of the lure.

6. The article of claim 5 further provided with additional slits on each side of the slit extending from the opening to the base, said additional slits extending from the base only part way toward the opening.

References Cited by the Examiner

UNITED STATES PATENTS

| 1,306,369 | 6/1919 | Bell | 24—130 |
| 1,429,465 | 9/1922 | Tolg | 40—20 |
| 1,797,234 | 3/1931 | Jordan | 43—42.2 |
| 1,990,693 | 2/1935 | Hildebrandt | 43—42.15 |
| 2,094,210 | 9/1937 | Graben | 24—17 |
| 2,799,113 | 7/1957 | Gonzales | 43—42.18 |
| 3,107,673 | 10/1963 | Haddad | 129—1 |

FOREIGN PATENTS

| 1,033,811 | 4/1953 | France. |
| 18,091 | 10/1898 | Switzerland. |

SAMUEL KOREN, *Primary Examiner.*

MELVIN D. REIN, ABRAHAM G. STONE,
*Examiners.*